United States Patent
Fischer et al.

(10) Patent No.: US 9,321,454 B2
(45) Date of Patent: Apr. 26, 2016

(54) METHOD FOR OPERATING A VEHICLE

(71) Applicant: Robert Bosch GmbH, Stuttgart (DE)

(72) Inventors: Uta Fischer, Gerlingen (DE); Udo Schulz, Vaihingen/Enz (DE); Rainer Schnurr, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/411,051

(22) PCT Filed: Jun. 6, 2013

(86) PCT No.: PCT/EP2013/061674
§ 371 (c)(1),
(2) Date: Dec. 23, 2014

(87) PCT Pub. No.: WO2014/001053
PCT Pub. Date: Jan. 3, 2014

(65) Prior Publication Data
US 2015/0375735 A1 Dec. 31, 2015

(30) Foreign Application Priority Data
Jun. 27, 2012 (DE) .......................... 10 2012 211 024

(51) Int. Cl.
*G07C 5/00* (2006.01)
*G01M 17/00* (2006.01)
*B60W 20/00* (2006.01)
(Continued)

(52) U.S. Cl.
CPC ............... *B60W 20/40* (2013.01); *B60W 10/06* (2013.01); *B60W 10/08* (2013.01); *F02D 41/1495* (2013.01); *G07C 5/0808* (2013.01); *B60W 2510/0666* (2013.01); *B60W 2510/085* (2013.01); *B60W 2520/105* (2013.01); *G01M 17/00* (2013.01); *Y10S 903/93* (2013.01)

(58) Field of Classification Search
USPC .......................................... 701/22
See application file for complete search history.

(56) References Cited

U.S. PATENT DOCUMENTS 3,393,557 A * 7/1968 Brown .................. G01H 1/003
330/69
5,720,258 A * 2/1998 Tolkacz ................ F02D 41/009
123/339.15
(Continued)

FOREIGN PATENT DOCUMENTS

DE 10 2006 012858 9/2007
DE 10 2006 051 931 6/2008
(Continued)

OTHER PUBLICATIONS

International Search Report for PCT/EP2013/061674, dated Aug. 1, 2013.

*Primary Examiner* — Shelley Chen
(74) *Attorney, Agent, or Firm* — Kenyon & Kenyon LLP

(57) ABSTRACT

A method for operating a vehicle includes: specifying a time-related target power demand for the vehicle to an internal combustion engine; and switching in an additional powering device in addition to the internal combustion engine when a time-related actual power demand of the vehicle on the internal combustion engine deviates from the time-related target power demand. The present invention makes it possible to operate the internal combustion engine in a diagnosis mode largely independently of the specific driving situation.

7 Claims, 4 Drawing Sheets

(51) Int. Cl.
*F02D 41/14* (2006.01)
*B60W 10/06* (2006.01)
*B60W 10/08* (2006.01)
*G07C 5/08* (2006.01)

(56) References Cited

U.S. PATENT DOCUMENTS

| | | | | |
|---|---|---|---|---|
| 5,830,064 A | * | 11/1998 | Bradish | G06F 7/58 463/22 |
| 2005/0060071 A1 | * | 3/2005 | Winner | B60K 31/0008 701/36 |
| 2005/0274553 A1 | | 12/2005 | Salman et al. | |
| 2006/0224283 A1 | | 10/2006 | Fussey et al. | |
| 2006/0230313 A1 | * | 10/2006 | Grichnik | G05B 23/0254 714/26 |
| 2009/0240640 A1 | * | 9/2009 | Blain | G01N 33/2888 706/12 |
| 2010/0006065 A1 | * | 1/2010 | Tripathi | F02D 41/0087 123/350 |
| 2010/0168989 A1 | * | 7/2010 | Gao | F02D 41/2422 701/110 |
| 2010/0213948 A1 | * | 8/2010 | Bauer | B60K 6/485 324/503 |
| 2010/0280737 A1 | * | 11/2010 | Ewert | B60K 6/445 701/102 |
| 2011/0166758 A1 | * | 7/2011 | Otanez | F16H 61/143 701/67 |
| 2011/0208405 A1 | * | 8/2011 | Tripathi | F02D 17/02 701/102 |
| 2011/0213540 A1 | * | 9/2011 | Tripathi | F02D 37/02 701/102 |
| 2011/0214650 A1 | * | 9/2011 | Wang | F02D 41/00 123/703 |
| 2013/0311025 A1 | * | 11/2013 | Tagawa | B60W 20/00 701/22 |

FOREIGN PATENT DOCUMENTS

| | | |
|---|---|---|
| DE | 2007 055 757 | 6/2009 |
| DE | 10 2008 000911 | 10/2009 |
| DE | 10 2008 025569 | 12/2009 |
| DE | 10 2009 028374 | 2/2011 |
| DE | 10 2010 003 940 | 10/2011 |
| DE | 10 2011 119 902 | 6/2012 |
| DE | 11 2009 003 207 | 6/2012 |

* cited by examiner

METHOD FOR OPERATING A VEHICLE

BACKGROUND OF THE INVENTION

1. Field of the Invention

The present invention relates to drive systems for vehicles and to a method for operating a vehicle.

2. Description of the Related Art

Published German patent application document DE 10 2006 051 931 A1 discloses a drive train for a hybrid vehicle. "Hybrid vehicles" encompasses vehicles that have a drive train with which at least two energy converters are associated in order to drive the vehicle. Energy converters of this kind can be, for example, electric motors and spark-ignition and diesel engines. In addition, two energy reservoirs are present in a hybrid vehicle, which reservoirs can be, for example, a storage battery for the electric motor or a fuel tank for the spark-ignition engine.

BRIEF SUMMARY OF THE INVENTION

According to a first aspect of the invention, a method for operating a vehicle is described, having the following steps:
 specifying a time-related target power demand by the vehicle to an internal combustion engine; and
 switching in an additional device in addition to the internal combustion engine when a time-related actual power demand by the vehicle on the internal combustion engine deviates from the time-related target power demand.

The "time-related target power demand by the vehicle on an internal combustion engine" is to be understood hereinafter to mean that the vehicle should call up from the internal combustion engine a specific power output in accordance with the time-related target power demand. This time-related target power demand can be selected to be constant over time, or to be variable. It can be affected by a tolerance, or can have a specific value. The "time-related actual power demand" is correspondingly to be understood as the power output that the vehicle is actually calling up from the internal combustion engine.

The method described is based on the consideration that the power output called up by a vehicle from the internal combustion engine as a rule is not predictable. Geographic structures, weather conditions, the traffic situation, driver behavior, and other conditions have an influence on the vehicle, so that the power output called up by the vehicle from the internal combustion engine fluctuates. A fluctuating power output correspondingly delivered by the internal combustion engine generally has an influence on fuel consumption, however, which is environmentally damaging due to increased $CO_2$ output, and furthermore uneconomical. Impairments to the driving comfort of the vehicle can also become perceptible.

In order to smooth out this fluctuation in the power output delivered by the internal combustion engine, it is proposed to capture positive and/or negative deviations from the time-related target power demand in the power output called up by the vehicle, by way of auxiliary devices available in the vehicle, and to evaluate them correspondingly. A suitable auxiliary device here is any energy load or energy generator in the vehicle that can correspondingly absorb excess energy and/or meet an additional demand by the vehicle for energy. For example, excess energy generated by the internal combustion engine can be absorbed by the generator and stored in a battery instead of lowering the rotation speed of the internal combustion engine.

Particularly preferably, the additional device is an electrical machine that acts, together with the internal combustion engine, on a drive train of the vehicle. A principle of this kind is known from the hybrid vehicles recited above. It is particularly suitable to compensate for positive and/or negative deviations, from a time-related target power demand by the vehicle, in a time-related actual power demand by the vehicle, and thereby to smooth out fluctuations in the power delivery by the internal combustion engine, since an electrical machine in generator mode can absorb excess electrical energy from the internal combustion engine and deliver it in motor mode to the vehicle in the case of an elevated energy demand that is not intended to result in a fluctuation in the power delivery from the internal combustion engine.

In particularly preferred fashion, the electrical machine is equipped for that purpose to charge an electrical energy reservoir when a difference between the time-related actual power demand and the time-related target power demand results in acceleration of the vehicle. In this case the vehicle would call up less power output from the internal combustion engine than it actually should, with the result that the corresponding power output excess would accelerate the vehicle. The corresponding energy excess is therefore temporarily stored.

Alternatively or additionally, the electrical machine is equipped to deliver a torque to the drive train of the vehicle when a difference between the time-related actual power demand and the time-related target power demand results in a deceleration of the vehicle. In this case the vehicle would call up more power output from the internal combustion engine than it actually should, so that because of the shortfall in power output the vehicle would be decelerated as a result of road friction, wind resistance, and other counteracting forces on the vehicle. This shortfall in power output can be furnished by the electrical machine.

The method described can be used in a particularly favorable manner for improved execution of a vehicle diagnosis operation, the time-related target power demand being dependent on a vehicle diagnosis to be carried out on the internal combustion engine. This refinement of the method described is based on the consideration that the time-related target power demand by the vehicle should exhibit a specific curve during vehicle diagnosis, so that based on a result expected in the context of vehicle diagnosis, it is possible to check whether the vehicle is functioning correctly. For example, in order to check the effectiveness of the lambda probe in a vehicle, the time-related target power demand should follow a curve in which, without the lambda probe, incomplete combustion would take place in the internal combustion engine if a corresponding amount of fuel were injected into the internal combustion engine. In order to produce this time-related target power demand, in the context of the above-described method fluctuations in the power uptake by the vehicle are compensated for by the auxiliary device, which particularly preferably is the electrical machine of a hybrid drive system.

In a particular refinement, the method described encompasses the steps of:
 estimating the time-related actual power demand of the vehicle on a route to be driven with the vehicle; and
 scheduling the vehicle diagnosis to be carried out based on a probability that the time-related target curve of the internal combustion engine's reaction can be imposed by switching in the additional device in addition to the internal combustion engine.

It is thereby possible to schedule a priori specifically when on a route a requirement will exist for compensating for possible fluctuations in the power delivery of the internal combustion engine. Such scheduling can be implemented particularly favorably in the context of so-called onboard diagnostic (OBD) tests, since such OBD tests are required by law and must be carried out at regular intervals while a vehicle is being driven. In order for the vehicle, and in particular the internal combustion engine, not to be constrainedly transferred into the operating states suitable for the OBD tests, by way of the method described it is possible to clarify in advance whether the operating states suitable for the OBD tests can be created on the route with the aid of the additional device during normal driving operation.

In a preferred refinement, the time-related actual power demand of the vehicle on the route to be driven with the vehicle is estimated on the basis of a navigation device, on the basis of a near-field sensor, and/or on the basis of data stored in a memory. It is thereby possible, in order to estimate the time-related actual power demand of the vehicle on the route to be traveled, to make assumptions that allow the estimates to become more reliable.

In a particularly preferred refinement, the method described encompasses the step of prohibiting vehicle diagnosis when the probability that the time-related target curve of the internal combustion engine's reaction, caused by switching in the additional device in addition to the internal combustion engine, can be imposed falls below a predetermined threshold value. It is thereby possible to prevent vehicle diagnosis operations and OBD tests from being started on route segments on which these are a priori predestined to fail and would thus unnecessarily raise the fuel consumption of the vehicle and/or degrade the emissions.

According to a further aspect, a control apparatus that is configured to carry out the method described is provided.

The control apparatus can furthermore have a memory and a processor. The method described is stored in the memory in the form of a computer program, and the processor is provided in order to carry out the method when the computer program is loaded from the memory into the processor.

According to a further aspect, a vehicle that encompasses the control apparatus described is provided.

DETAILED DESCRIPTION OF THE INVENTION

Figure 1:
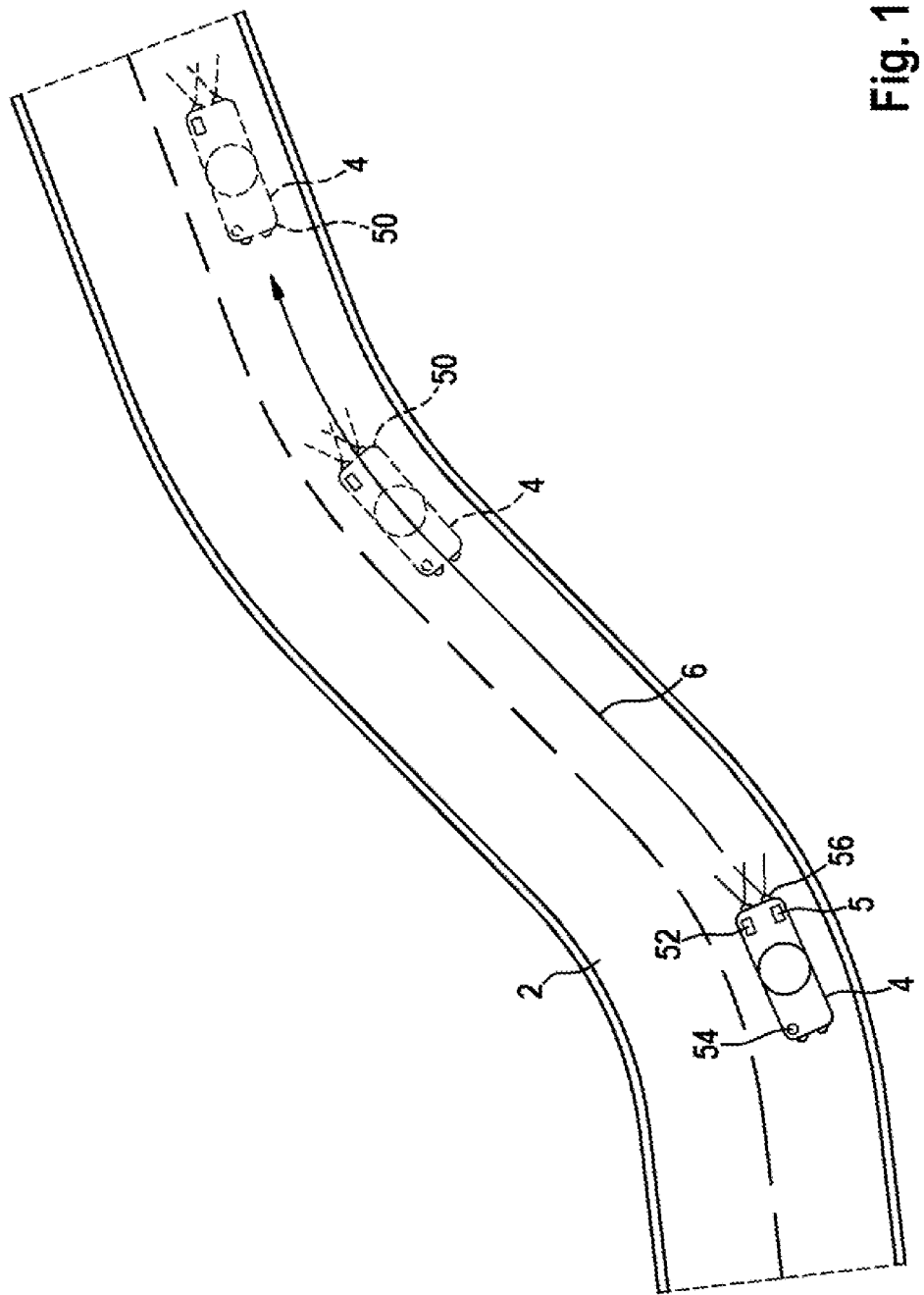
FIG. 1 schematically depicts a vehicle driving on a road.

In the Figures, elements having an identical or comparable function are labeled with identical reference characters and are described only once.

Figure 2:
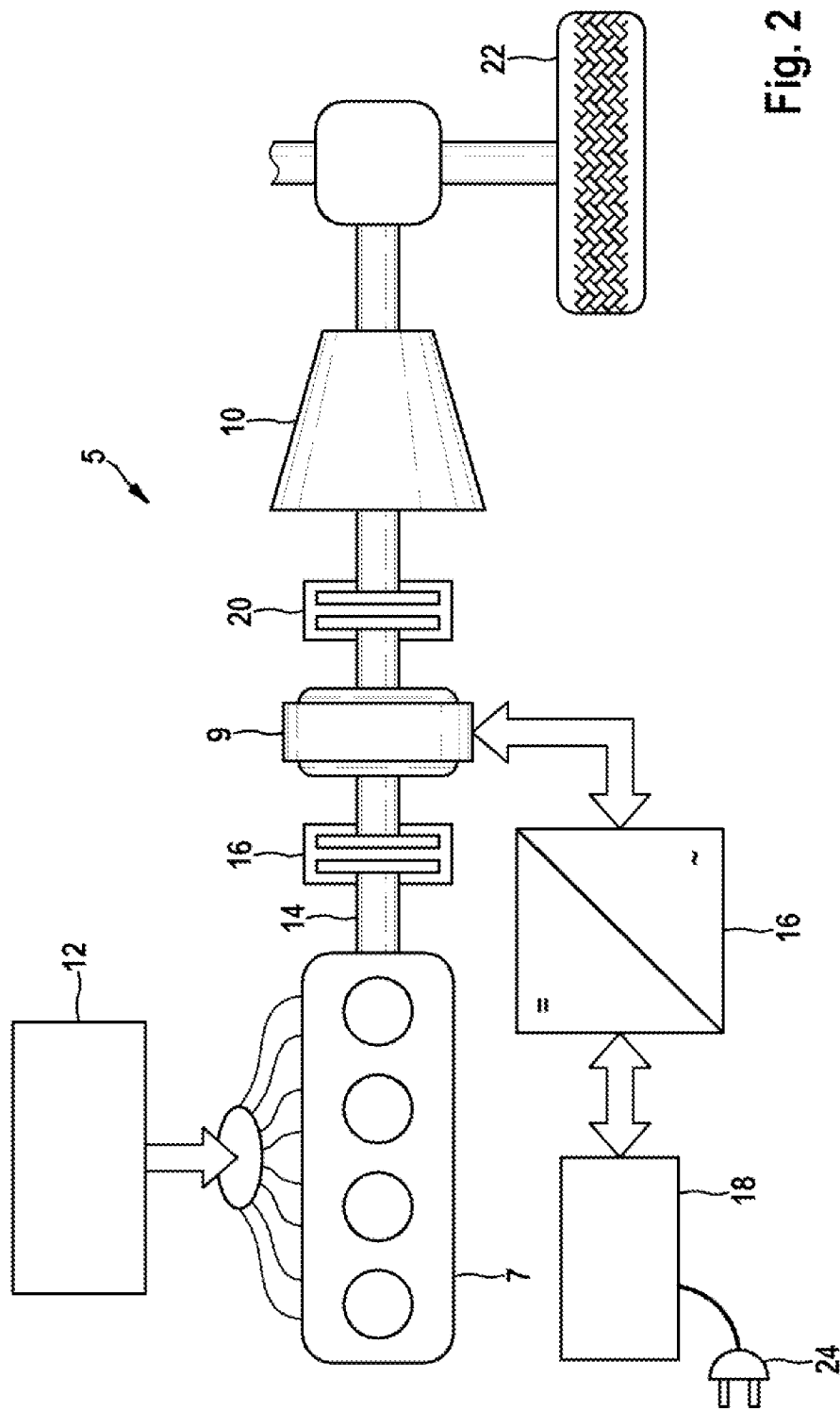
FIG. 2 schematically depicts an exemplifying vehicle diagnosis system.

Referring to FIG. 1, which schematically depicts a vehicle 4 driving on a road 2:

Vehicle 4 possesses a drive train 5, explained in more detail in FIG. 2, with which vehicle 4 is moved on road 2 along a route 6. As will be explained in more detail later on, drive train 5 encompasses an internal combustion engine 7 and an electrical machine 9.

In FIG. 1, the vehicle is located at an assumed first point in time at a location on road 2 at which vehicle 4 is depicted with solid lines in FIG. 1. Vehicle 4 is furthermore depicted in FIG. 1 with dashed lines at a second and a third location at which it will be located, at a second and a third point in time in the future viewed from the first point in time.

In order to ensure correct operation of internal combustion engine 7, so-called onboard tests (OBD tests) are required by law so that emissions-relevant incorrect operation of internal combustion engine 7 can be detected in timely fashion and environmental impacts due to incorrect operation of vehicle 4 can be avoided. OBD tests of this kind are defined, for example by the California Air Resources Board (CARB). One function required by CARB for the documentation of completed vehicle diagnostic tests is the Diagnostic In-Use Monitor Performance Ratio, abbreviated DIUMPR, the specification of which is known to one skilled in the art.

The OBD tests on emissions-relevant components of internal combustion engine 7 must be carried out on the basis of test cycles. While an OBD test is being carried out, internal combustion engine 7 must conform to a required operating behavior, for example in terms of an internal combustion engine torque. Based on the required operating behavior, a check can be made as to whether or not the emissions-relevant components of internal combustion engine 7 are reacting in a faulty manner. The operating behavior of internal combustion engine 7 in real driving operation is, however, as a rule always different from the required operating behavior, so that failure to conform to the required operating behavior of internal combustion engine 7 during a corresponding OBD test causes the test to be discontinued, and the OBD test attempts to repeat upon the next entry into the required operating behavior of internal combustion engine 7.

Before execution of the OBD test is discussed further, the aforementioned drive train 5 of vehicle 4 will be described in more detail.

Drive train 5 encompasses internal combustion engine 7, electrical machine 9, and a transmission 10. Internal combustion engine 7 is supplied with fuel from a tank 12. Internal combustion engine 7 generates mechanical rotational energy at an output drive shaft 14. A coupling 16 is connected on the one hand to internal combustion engine 7 and on the other hand to electrical machine 9. Electrical machine 9 is electrically connected to a power converter 16 that is in turn connected to an electrical energy reservoir 18. Electrical energy reservoir 18 can thus convey electrical energy to power converter 16, which uses said energy in order to drive electrical machine 9. Energy stored in electrical energy reservoir 18 is thereby used to drive vehicle 4.

When electrical machine 9 is connected via claw coupling 16 to internal combustion engine 7 that generates the electrical rotation energy, current then flows from electrical machine 9 to power converter 16, which rectifies said current. The current rectified by power converter 16 charges electrical energy reservoir 14. The mechanical energy delivered by internal combustion engine 7 is thus converted by electrical machine 9 and power converter 16, and can thus be stored in electrical energy reservoir 18.

Electrical machine 9 is furthermore connected via a second coupling element 20 to transmission 10. Transmission 18 is in turn connected to wheels 22 of vehicle 4. While driving, vehicle 4 possesses a kinetic energy as a result of its mass and speed; in the context of braking operations, said energy can be transferred from wheels 22 via transmission 18 and via second coupling element 20 to electrical machine 9. The latter can in turn convert the kinetic energy, transferred in that manner, of the vehicle into electrical energy, which is rectified by power converter 12 and is used to charge electrical energy reservoir 18.

Kinetic energy to be dissipated in the context of braking operations can thus be temporarily stored in electrical energy reservoir 18. Alternatively or additionally, electrical energy reservoir 18 can also be charged via a charging cable 24 that can be charged, for example, with an ordinary household electrical socket (not depicted further), as is the case e.g. with so-called plug-in hybrid vehicles.

In summary, electrical machine 9 in drive train 5 of vehicle 4 converts between mechanical and electrical energy, and can thus assist with driving vehicle 4 or can absorb excess electrical energy, which occurs e.g. upon braking or when traveling downhill, from drive train 5 of vehicle 4.

Figure 3:
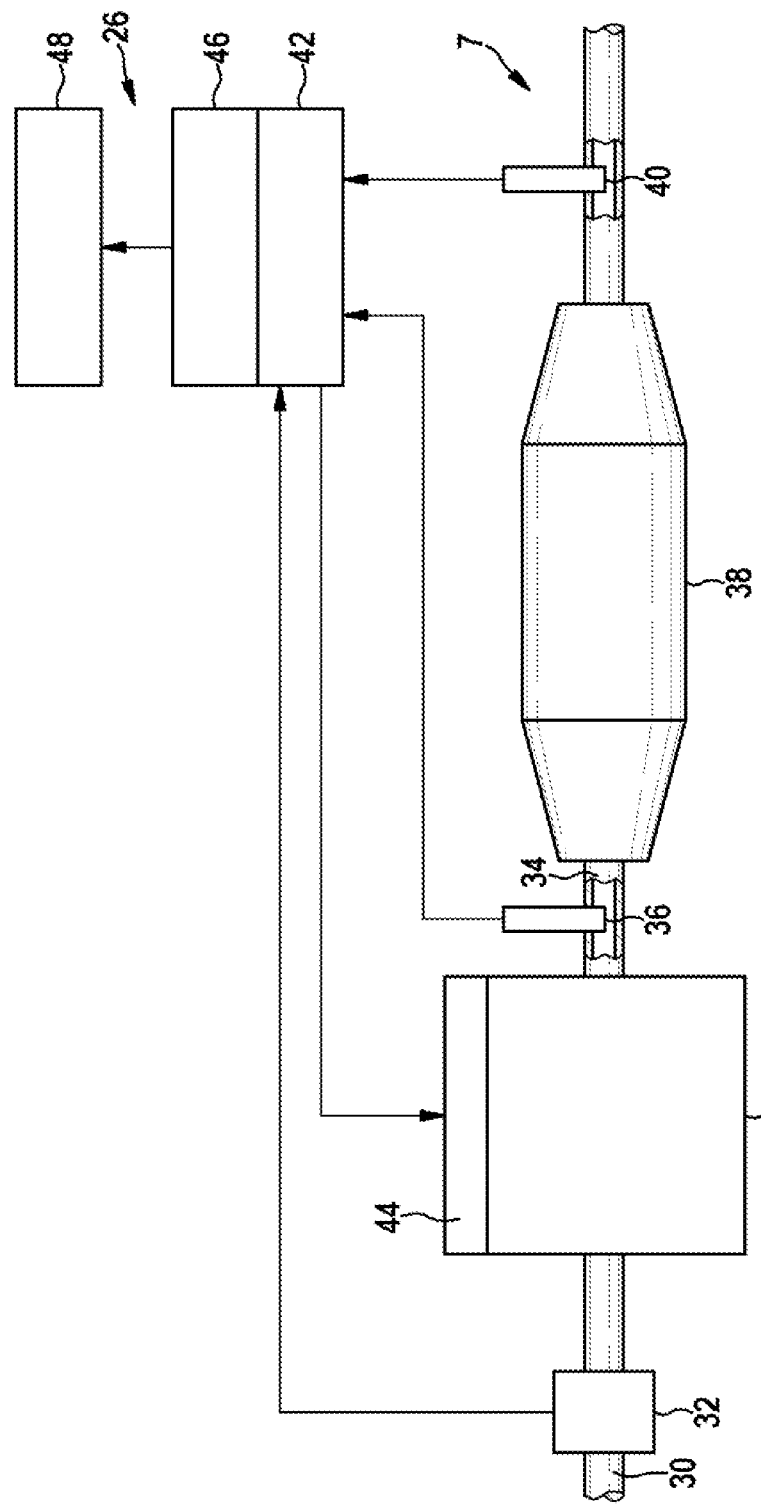
FIG. 3 shows an example of a time-related speed curve of the vehicle driving on a road, alongside an example of a mixture distribution curve.

Referring to FIG. 3, which schematically depicts an example of a vehicle diagnosis system 26 that is suitable for executing an OBD test:

Vehicle diagnosis system 26 monitors depicts internal combustion engine 7, made up of an engine block 28 and an intake air conduit 30 that supplies fresh air to engine block 28, the quantity of fresh air flowing through intake air conduit 30 being identifiable using an intake air measuring device 32. The exhaust gas of internal combustion engine 7 is guided via an exhaust emissions control system that has as a principal component an exhaust conduit 34 in which, in the flow direction of the exhaust gas, a first exhaust gas sensor 36 is disposed before a catalytic converter 38 and a second exhaust gas sensor 40 is disposed after catalytic converter 38.

The two exhaust gas sensors 36, 40 are connected to a control device 42, called an "engine electronic system," that calculates from the data of exhaust gas sensors 36, 40 and from the data of intake air measuring device 32 a ratio between a fuel injected into engine block 38 and the fresh air flowing through intake air conduit 30. Based on the calculated ratio, control device 42 applies control to a fuel metering device 44 and thereby controls the quantity of fuel injected into engine block 28. Coupled to control device 42 or integrated thereinto is a diagnosis device 46 with which the signals of exhaust gas sensors 36, 40 can be evaluated. Diagnosis device 46 can furthermore be connected to a display/memory unit 48 on which the evaluation results from diagnosis device 46 can be depicted or stored.

With first exhaust gas sensor 36 disposed in exhaust gas conduit 34 after engine block 28, and with the aid of control device 42, it is possible to establish a lambda value that is suitable for achieving an optimum control effect with the exhaust emissions control system. Second exhaust gas sensor 40 disposed in exhaust gas conduit 34 after catalytic converter 38 can likewise be evaluated in control device 42 and serves to identify, in a method known per se, the oxygen storage capability of the exhaust emissions control system.

For vehicle diagnosis, in vehicle diagnosis system 26 that is shown a control algorithm is implemented, by way of example, in diagnosis device 46; said algorithm makes it possible to check the dynamics of a controlled system of internal combustion engine 5, encompassing exhaust gas sensors 36, 40 as measuring elements 36, 40, engine block 28 as actuating member, and control device 42 as controller.

In an OBD test that checks the dynamics of first exhaust gas sensor 36, the fuel mixture could be deliberately over-enriched by diagnosis device 30 in order to check whether first exhaust gas sensor 36 detects that over-enrichment and whether the control loop encompassing first exhaust gas sensor 36 reacts within specific time limits to said over-enrichment. If a slight enrichment of the fuel mixture is necessary as a result of the operating behavior of internal combustion engine 7, however, the control loop encompassing first exhaust gas sensor 36 then reacts to the over-enrichment but not within the defined time limits. The OBD test fails and must be repeated.

If this OBD test is repeated too often, the result can be additional fuel consumption that is due exclusively to that OBD test. Other OBD tests that adjust the fuel mixture can be used, for example, when diagnosing catalytic converter 38 and when diagnosing the dynamics of second exhaust gas sensor 40 after catalytic converter 38. In addition to the elevated fuel consumption, OBD tests of this kind can also be environmentally objectionable, since if they are carried out too often, active adjustment of this kind in the fuel mixture degrades the exhaust emissions, which over the long term results in a degraded emissions balance.

In order to avoid the aforementioned additional fuel consumption and unnecessary environmental impacts, the present embodiment proposes to control the power output of internal combustion engine 7 using electrical machine 9 shown in FIG. 2 as an additional device, and to provide that said machine adheres to a specific target power delivery that is necessary for successful completion of a specific OBD test. If a specific OBD test that, for example, requires driving on a straight segment with no hills, or at a constant engine load, is therefore begun in the context of the present embodiment, and if the vehicle nevertheless arrives at a hill during said OBD test, electrical machine 9 can supply from electrical energy reservoir 18 the additional power output, beyond the target power delivery, for traveling up the hill, or can absorb the excess power output, beyond the target power delivery, that internal combustion engine 7 must provide in order for the OBD test to be successfully carried out, and store it in electrical energy reservoir 18.

The aforementioned additional device can be any electrical load and electrical generator in vehicle 4, but electrical machine 9 can not only absorb but also deliver electrical power, and can thus not only meet the additional power demand beyond the target power output, but also absorb an excess power output beyond the target power output. Electrical machine 9 is therefore particularly favorable for technical implementation of the present invention.

In order to further increase the probability of successfully carrying out an OBD test, route 6 shown in FIG. 1 can be investigated, an estimate being made of those route segments 50 on which it is improbable that a specific OBD test can be carried out even with the assistance of electrical machine 9. This can be done, for example, using control apparatus 42 and/or diagnosis device 46. In context of this investigation and estimate it is possible to exclude, for performance of a specific OBD test, segments on route 6 for which it is evident a priori that on said route segments, electrical machine 9 cannot furnish an additional demand for power from internal combustion engine 7 in addition to the target power output, or cannot absorb from internal combustion engine 7 an excess power output beyond the target power output. In the example mentioned initially, for example, the slope of the hill could be too steep, at these locations.

Route 6 can be investigated adaptively, for example based on a recognition that said route 6 has already been driven before. For this purpose, for example, a table can be stored in a memory 52 of vehicle 4, in which table, for example, the steering angle of the vehicle and an inclination angle of the vehicle are correlated with a route that has been driven. If a correlation of the trajectory of the present route 6 with the steering angle corresponds to the correlation stored in memory 52, it can be inferred that the route is one that has already been traveled. Driver profiles, from which the driving behavior of the driver on route 6 can be derived, can additionally be stored in memory 52.

Alternatively or additionally, the investigation of route 6 can also be accomplished predictively using a navigation system 54 and optionally a near-field sensor 56, from which environmental and traffic data regarding route 6 can be derived. Here as well, the driving behavior of the driver can also be included in the investigation of route 6. For example, traffic jams on route 6 could be detected using navigation system 54. Based on these detected jams, it would then be possible to schedule those OBD tests of vehicle 4 which would need to be carried out with vehicle 4 at a standstill or while vehicle 4 is in stop-and-go traffic. Alternatively or additionally, the surroundings of vehicle 4 could be scanned with near-field sensor 56. For that purpose, near-field sensor 56 could be, for example, a camera having a connected image evaluation system. For example, if a slow-moving vehicle is detected in front of vehicle 4, an imminent braking operation can, for example, be inferred and can be incorporated into the scheduling of an OBD test that is to be carried out.

It is thereby possible to improve the execution of the OBD tests and of the DIUMPR recited initially.

The scheduling of some OBD tests will be explained by way of example based on FIG. 4, on the basis of a curve 58 for internal combustion engine torque 59 of internal combustion engine 7 on route 6 which is plotted against time 61. Correlated with this curve 58 for internal combustion engine torque 59 is the ratio 63, recited above, between the fuel injected into engine block 28 and the fresh air flowing through intake air conduit 30, which ratio is likewise plotted against time. For simplicity's sake, ratio 63 is referred to hereinafter as mixture 63.

Curve 58 of internal combustion engine torque 59 can be predictively estimated and/or adaptively identified, in the manner described above.

Curve 58 for internal combustion engine torque 49 firstly encompasses an initial stationary phase 60 after vehicle 4 is started. After the initial stationary phase 60, in an acceleration phase 62 vehicle 4 is accelerated to an average driving speed. This can be, for example, the acceleration after leaving the location where vehicle 4 is parked in a garage or parking space. After acceleration phase 62, in a driving phase 64 the average driving speed is maintained over a time period that is predictable by predictive or adaptive identification of curve 58 for internal combustion engine torque 59, until vehicle 4 is once again decelerated to a stop during a braking phase 66, for example because it is expected that it needs to stop at a traffic signal. This is followed again by a stationary phase 60, followed correspondingly by an acceleration phase 62, a driving phase 64, and a braking phase 66. This sequence repeats more or less regularly.

Figure 4:
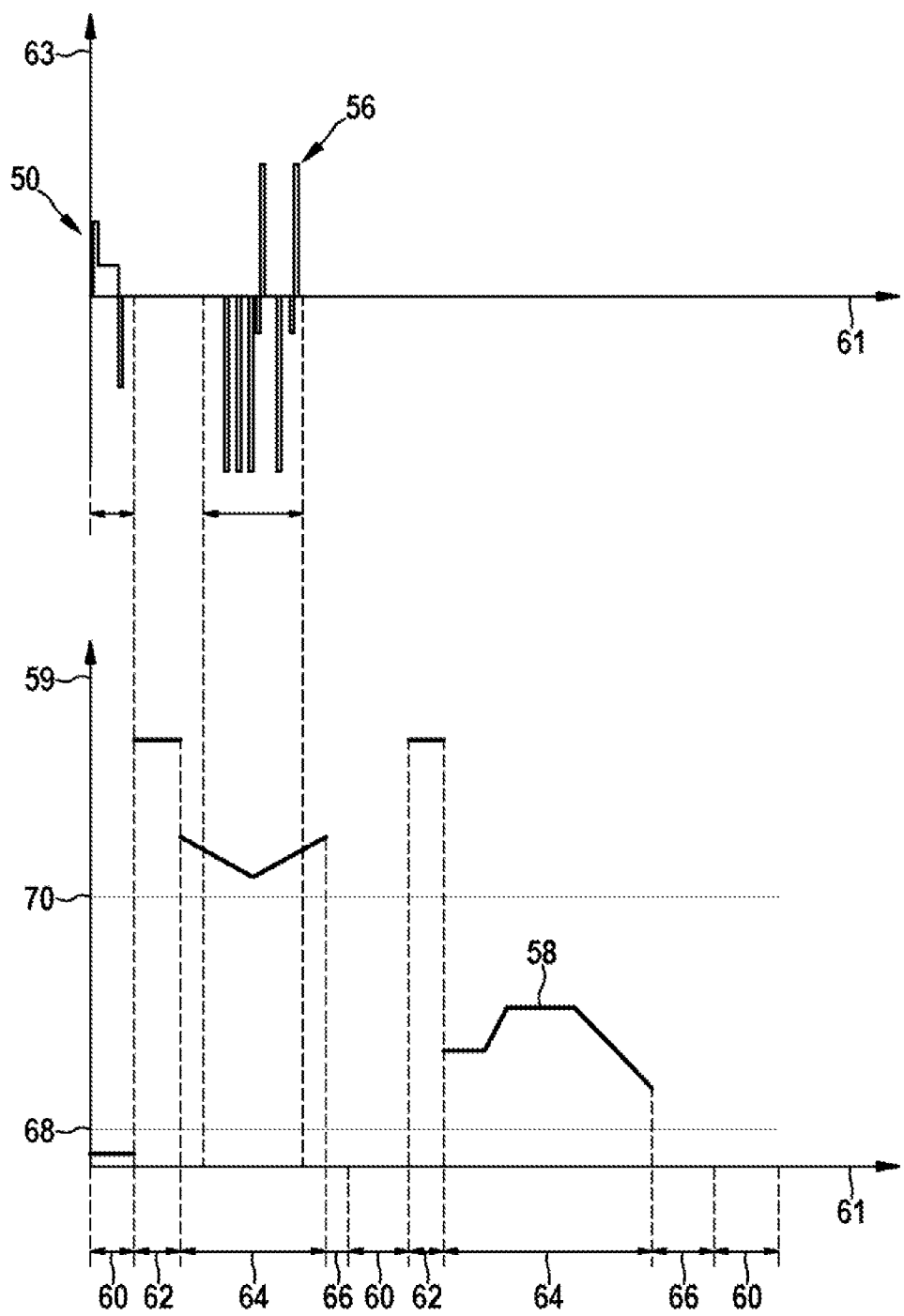
FIG. 4 is a structural diagram of a control circuit for adapting a power output delivered by an internal combustion engine to a time-related target power demand.

As is evident from FIG. 4, curve 58 for internal combustion engine torque 59 does not need to be constant during the individual phases 60 to 66. It is dependent, for example, on curves on route 6, on traffic jams to be expected on route 6, and on other incidents influencing the journey of vehicle 4.

Based on the estimated curve 58 for internal combustion engine torque 59, it is then possible to identify those time periods in which the prospects for successfully carrying out a specific OBD test are particularly good. This is done by considering whether a difference between the aforementioned target torque to be delivered by internal combustion engine 7 for the OBD test, which torque is labeled in FIG. 4 with the reference characters 68, 70, and curve 58 for internal combustion engine torque 59, and identifying whether that difference can be compensated for by electrical machine 9.

In a first stationary phase 60, a first adjustment of mixture 63 in order to heat up catalytic converter 38 could have begun, since the estimated curve 58 for internal combustion engine torque 59 is only slightly below a first target torque 68 that would be necessary for that OBD test. For this OBD test internal combustion engine 7 would deliver, in order to furnish target power output 68, more power than would be necessary for the operation of vehicle 4. This extra delivered power would then be directed via electrical machine 9 into electrical energy reservoir 18.

Correspondingly, during first driving phase 64 a second mixture adjustment 56 for diagnosis of first exhaust gas sensor 36 could be scheduled, since the estimated curve 58 for internal combustion engine torque 59 is only slightly above a second target torque 70 that would be necessary for that OBD test. For this test internal combustion engine 7 would need to deliver, in order to furnish target torque 68, less power output that would be necessary for the operation of vehicle 4. The additional power demand would then be furnished via electrical machine 9 from electrical energy reservoir 18.

What is claimed is:

1. A method for operating a vehicle, comprising:
   specifying a time-related target power demand for the vehicle to an internal combustion engine powering the vehicle, the time-related target power demand being dependent on a vehicle diagnosis to be carried out on the internal combustion engine;
   switching in an additional powering device for the vehicle in addition to the internal combustion engine when a time-related actual power demand of the vehicle on the internal combustion engine deviates from the time-related target power demand;
   estimating the time-related actual power demand of the internal combustion engine on a route to be driven with the vehicle;
   scheduling the vehicle diagnosis to be carried out based on a probability that a difference between the time-related actual power demand and the time-related target power demand can be compensated for by switching in the additional powering device in addition to the internal combustion engine; and
   prohibiting vehicle diagnosis when the probability falls below a predetermined threshold value.

2. The method as recited in claim 1, wherein the additional powering device is an electrical machine which acts, together with the internal combustion engine, on a drive train of the vehicle.

3. The method as recited in claim 2, wherein the electrical machine is configured to charge an electrical energy reservoir when a difference between the time-related actual power demand and the time-related target power demand results in acceleration of the vehicle.

4. The method as recited in claim 3, wherein the electrical machine is configured to deliver a torque to the drive train of the vehicle when a difference between the time-related actual power demand and the time-related target power demand results in a deceleration of the vehicle.

5. The method as recited in claim 1, wherein the time-related actual power demand of the vehicle on the route to be driven with the vehicle is estimated on the basis of at least one of data from a navigation device, data from a near-field sensor, and data stored in a memory.

6. A control apparatus for operating a vehicle, comprising:
   a control unit including a processor configured to perform the following:
   specifying a time-related target power demand for the vehicle to an internal combustion engine powering the vehicle, the time-related target power demand being dependent on a vehicle diagnosis to be carried out on the internal combustion engine;

switching in an additional powering device for the vehicle in addition to the internal combustion engine when a time-related actual power demand of the vehicle on the internal combustion engine deviates from the time-related target power demand;

estimating the time-related actual power demand of the internal combustion engine on a route to be driven with the vehicle;

scheduling the vehicle diagnosis to be carried out based on a probability that a difference between the time-related actual power demand and the time-related target power demand can be compensated for by switching in the additional powering device in addition to the internal combustion engine; and prohibiting vehicle diagnosis when the probability falls below a predetermined threshold value.

7. A non-transitory, computer-readable data storage medium storing a computer program having program codes which, when executed on a computer, performs a method for operating a vehicle, the method comprising:

specifying a time-related target power demand for the vehicle to an internal combustion engine powering the vehicle, the time-related target power demand being dependent on a vehicle diagnosis to be carried out on the internal combustion engine;

switching in an additional powering device for the vehicle in addition to the internal combustion engine when a time-related actual power demand of the vehicle on the internal combustion engine deviates from the time-related target power demand;

estimating the time-related actual power demand of the internal combustion engine on a route to be driven with the vehicle;

scheduling the vehicle diagnosis to be carried out based on a probability that a difference between the time-related actual power demand and the time-related target power demand can be compensated for by switching in the additional powering device in addition to the internal combustion engine; and prohibiting vehicle diagnosis when the probability falls below a predetermined threshold value.

* * * * *